United States Patent
Fink et al.

(10) Patent No.: US 6,820,258 B1
(45) Date of Patent: Nov. 16, 2004

(54) SYSTEM AND METHOD FOR DYNAMICALLY OPTIMIZING EXECUTING ACTIVATIONS

(75) Inventors: Stephen J. Fink, Yorktown Heights, NY (US); Mark Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 09/649,320

(22) Filed: Aug. 28, 2000

(51) Int. Cl.[7] .............................................. G06F 9/45
(52) U.S. Cl. ..................................................... 717/158
(58) Field of Search ............................... 717/108, 118, 717/127–167, 124; 714/35, 36

(56) References Cited

U.S. PATENT DOCUMENTS

| | | | | |
|---|---|---|---|---|
| 5,539,907 A | * | 7/1996 | Srivastava et al. | 717/130 |
| 5,675,803 A | * | 10/1997 | Preisler et al. | 717/131 |
| 5,911,073 A | * | 6/1999 | Mattson et al. | 717/104 |
| 6,088,525 A | * | 7/2000 | Peri | 717/150 |
| 6,164,841 A | * | 12/2000 | Mattson et al. | 716/1 |
| 6,189,141 B1 | * | 2/2001 | Benitez et al. | 717/153 |
| 6,223,339 B1 | * | 4/2001 | Shah et al. | 717/158 |
| 6,314,558 B1 | * | 11/2001 | Angel et al. | 717/118 |
| 6,481,008 B1 | * | 11/2002 | Chaiken et al. | 717/158 |

* cited by examiner

*Primary Examiner*—Todd Ingberg
*Assistant Examiner*—Tuan Anh Vu
(74) *Attorney, Agent, or Firm*—Scully, Scott, Murphy & Presser; Richard M. Ludwin, Esq.

(57) ABSTRACT

A system and method for dynamically optimizing a code sequence of a program while executing in a computer system comprises: identifying one or more program yield points in an original code sequence at which a run-time representation of the original code sequence may be optimized in an executing program; generating a prologue of instructions for setting up program state associated with the original code sequence at a particular yield point; adding the prologue of instructions to an intermediate representation of the original code sequence code for generating a specialized code sequence; and, compiling the specialized code sequence with a compiler for generating a run-time representation of the specialized code sequence, the run-time representation being further optimized for execution on a target computer system.

20 Claims, 3 Drawing Sheets

SYSTEM AND METHOD FOR DYNAMICALLY OPTIMIZING EXECUTING ACTIVATIONS

BACKGROUND OF THE INVENTION

1. Field of the Invention

This invention relates generally to computer program execution systems, e.g., optimizing compilers, and more specifically, to a system and method for dynamically optimizing running programs to result in specialized code tailored and optimized to a specific execution of the program for improved performance.

2. Discussion of the Prior Art

Some modern programming languages (e.g., Java) support dynamic loading of the application program at run-time. Since the program code is not available until run-time, language implementations and virtual machines dynamically optimize or Just-In-Time compile the program as it runs. One problem of this approach arises when trying to dynamically optimize a program while it runs. After generating the optimized code, the system must somehow translate the state of the running program into a form that allows execution to continue in the optimized code. This translation raises engineering problems for the optimizing compiler; all optimizations and phases of the compiler must account for potential transition, complicating the compiler implementation and potentially inhibiting some optimizations.

As defined herein, an activation is a single execution of a code sequence, such as a procedure or method in a running program. An activation is a dynamic entity; for example, as a program calls and returns from procedures or methods, it creates and destroys activations. An activation may refer to execution of a code sequence in either an interpreted or compiled context. An activation is associated with a program state, which comprises current values of memory locations, variable values, and execution context of the executing code sequence of the activation. The particular instantiation of program state depends on the implementation of the run-time system that executes the code sequence of the activation. For example, in a Java virtual machine, the program state may consist of the values of variables and stack locations in the virtual machine specification, along with a bytecode index identifying the current program counter. Alternatively, an interpreter may define program state in terms of memory locations and variable values used in the internal interpreter implementation. A dynamic binary translation system might use an intermediate representation close to the binary interface for the machine target.

For example, consider an activation representing the execution of a sequence of Java bytecodes. The program state for an activation is a triple <PC, S, L>: with PC representing the program counter; i.e., the offset of the currently executing bytecode; with S holding the values of the stack, a set of abstract memory locations as defined by the Java Virtual Machine Specification; and, with L holding the values of the local variables, named abstract memory locations as defined by the Java Virtual Machine Specification.

Previous systems such as the Self-93 system and the IBM Mixed-Mode Interpreter JIT support dynamic optimization of procedure activations. However, these systems rely on a method whereby the optimizing compiler generates code for the original source code, and provides extensive mapping information to translate program state into the machine state for the optimized code. These approaches furthermore require tremendous engineering effort into building the optimizing compiler in order to support transition to optimized code at various program points, and, particularly, to enable the optimizing compiler to keep careful track of mappings from original program state to the state of the optimized code.

It would thus be highly desirable to provide an optimizing compiler that may efficiently generate a specialized optimization of a program without the need for modifying the optimizing compiler.

SUMMARY OF THE INVENTION

It is an object of the present invention to provide a system for dynamically optimizing running code by generating specialized code tailored and optimized to a specific execution of the program while preserving semantics of original program code.

It is a further object of the present invention to provide a system for dynamically optimizing running code before or during run time.

It is another object of the present invention to provide an apparatus for efficiently generating a specialized optimization of a program without the need for modifying the optimizing compiler.

It is another object of the present invention to provide a system for dynamically optimizing running code by generating specialized code tailored and optimized to a specific execution and including a prologue of instructions for providing program state.

According to the invention, there is provided a system and method for dynamically optimizing a code sequence of a program while executing in a computer system, the method comprising: a) inserting one or more program yield points at which an unoptimized original code sequence may be optimized in the executing program; b) generating a prologue of instructions for setting up program state associated with the unoptimized original code sequence; c) adding the prologue of instructions to an intermediate representation of the original code sequence code for generating a specialized code sequence; and, d) compiling the specialized code sequence with an optimizing compiler for generating a run-time representation of the specialized code sequence, the run-time representation being further optimized for execution on a target computer system.

Advantageously, such a system and method for preserving semantics of original program code by addition of the specialized continuation exploits run-time state to generate better code for improving performance for longer running procedure activations.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
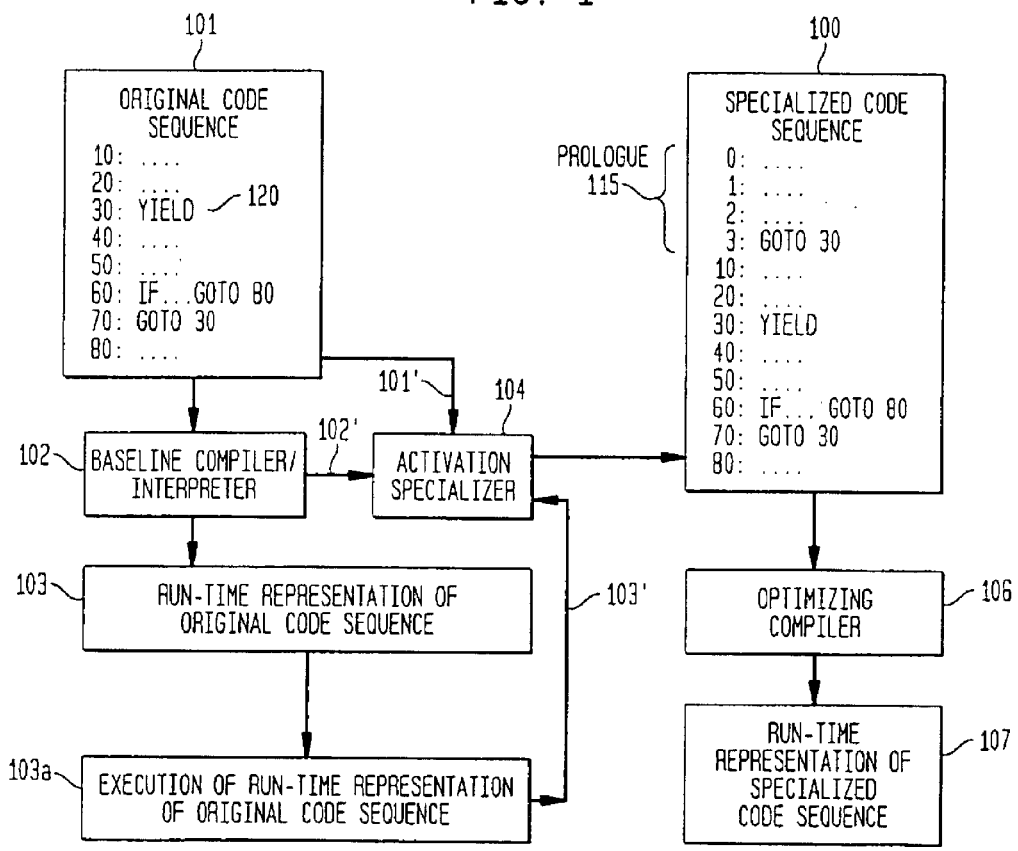
FIG. 1 is a block diagram illustrating conceptually the method for dynamically optimizing executing activations according to the present invention.

According to the invention, the method for dynamically optimizing executing activations is initiated for an unoptimized activation which may be implemented either by an interpreter, or by a non-optimizing compiler. It is assumed that there exists a known mechanism for extracting the program state from the unoptimized activation. For example, in a Java interpreter, it is trivial to extract the <PC, S, L> triple from the interpreter's data structures.

To generate an optimized activation the following steps are performed: In a first step, the system determines a yield point for the unoptimized activation which is defined as the program point at which the system may optimize a running activation. Specifically, as will be explained in greater detail, the system automatically determines where the yield points may be inserted in the original program code sequence. Example program yield points may include a point immediately prior to entry of a processing loop, or, after a variable/register declaration/declaration.

Continuing, the original code sequence is input to a baseline compiler/interpreter which generates a run-time representation of the original code sequence while executing. It is understood that state information includes values of variables and memory locations that are extracted from the unoptimized activation by an activation specializer as will be described in greater detail herein below. That is, the state information is obtained from the intermediate run-time representation of the original code sequence executing in the baseline compiler/interpreter. The activation specializer then generates specialized code for the activation.

In the next step, the activation specializer adds a prologue of instructions to the original intermediate representation of the code for the activation to generate a specialized code sequence. The prologue includes a set of instructions that sets up the program state followed by an instruction that directs control flow of the program to the yield point for the optimized activation (such as the "goto" Java Virtual Machine instruction). This prologue sets up program state by setting values of variables and memory locations to match the program state extracted from the unoptimized activation. Then, the specialized code sequence is compiled with an optimizing compiler, producing a specialized optimized continuation of the activation. The optimizing compiler transforms the specialized code sequence into a run-time representation for execution by a target platform. The optimizing compiler may perform any legal semantic-preserving transformations, such as constant propagation, redundancy elimination, or dead code elimination. As long as the generated machine code obeys the semantics of the specialized code sequence, the resultant execution will be correct. Finally, the target platform executes the run-time representation of the specialized optimized continuation.

According to the principles of the invention, there are several embodiments in which the procedure may be implemented, each differing in how and when they generate specialized code. In the first embodiment, the specialized continuation is generated at run-time when the unoptimized activation is interrupted. In this case, the specialized continuation is optimized based on run-time values of variables. In the second embodiment, a specialized continuation is generated for each potential yield point of the unoptimized code. That is, each continuation is specialized for the yield point program point, but not for run-time values of program variables. In the third embodiment, a single optimized code image is generated for all yield points. That is, the single optimized binary code is not optimized for either run-time values or program points.

More particularly, the generation of a specialized continuation at run-time in accordance with the first embodiment is depicted in FIG. 1. Assuming the unoptimized activation has been generated by a non-optimizing (or "baseline") compiler 102, i.e., the baseline compiler has generated a run-time representation for the original unoptimized activation, the baseline compiler preserves information that allows the run-time system to extract the program state as described earlier. This procedure would be similar if it is assumed that an interpreter executes the unoptimized activation.

In further view of FIG. 1, after input of the original code sequence 101 to the baseline compiler 102, the baseline compiler generates a run-time representation 103 of the original code sequence. In FIG. 1, the YIELD point 120 in the original code sequence 101 indicates the point at which the running activation will be optimized. In practice, the YIELD point 120 may not appear in original code sequence, but would be inserted by the baseline compiler at an appropriate point. For example, the baseline compiler may choose to insert yield points in method prologues and at the head of loops in the original code sequence. When the run-time representation of the original code sequence is executed 103a, the program halts at the YIELD point, and a system module called the activation specializer (104) is invoked. The activation specializer records the program state at this YIELD point, and generates a specialized code sequence. The specialized code sequence holds the sequence of instructions that would restore the program state extracted from the running activation, and continue execution from the yield point.

In order to extract the program state, the activation specializer 104 relies on information 101' from the original code sequence, information 102' from the baseline compiler, and the running version of the original code sequence 103'. The steps to extract the program state depend on the implementation of the original run-time execution, and would be considered within the purview of skilled artisans. For example, the steps to extract program state from an interpreter implementation would be apparent to those skilled in the art. For example, the reference to Holze et. al entitled "Debugging Optimized Code with Dynamic Deoptimization" ACM SIGPLAN 92, June 1992, describes the process for extracting program state from the prior art Self-93 system.

Given the program state, the activation specializer generates the specialized code sequence with a prologue 115 that sets up the appropriate state 105. In the example in FIG. 1, the specialized prologue 115 first sets up values for program variables, and then inserts a jump to the instruction line 30 where the code was interrupted. Note that this instruction (line 30) corresponds to the yield point where the unoptimized activation was interrupted and the program state extracted. Thus, the remaining execution of this method is optimized, continuing execution from the yield point at line 30. It is understood that the prologue is constructed so that executing the specialized code from the beginning is semantically equivalent to continuing execution of the interrupted activation. Thus, to optimize the activation, a "black-box" optimizing compiler 106 is implemented to generate the semantically correct run-time representation of the specialized code sequence 107, which is then executed.

There are three embodiments for setting up the specialized prologue. Each of the three embodiments are illustrated by way of example, with an assumption that there exists an original code sequence with program state similar to the Java bytecode example given earlier: a triple <PC, S, L> extracted from the interpreter's data structures. In the illustrative example it is assumed that there exists an un-optimized activation with two yield points, at program counter 20 and 30 respectively.

In the first embodiment, the activation specializer 104 generates a specialized code sequence based on the run-time state of the running unoptimized activation. For example, it is assumed that the method is interrupted at the yield point at program counter 30, and the activation's stack has three locations, with these locations holding the values 10, 30, and 50, respectively. Finally, in the example, it is assumed that the activation has two locals, L1 and L2, holding the values 7 and 9, respectively.

In a pseudo-code depiction, the specialized code sequence for this activation will have the following prologue according to the first embodiment:

```
PUSH 50 on the STACK
PUSH 30 on the STACK
PUSH 10 on the STACK
L1 := 7
L2 := 9
JUMP to INSTRUCTION 30
ORIGINAL INSTRUCTION 1
ORIGINAL INSTRUCTION 2
. . .
```

Note that in this embodiment, the optimizing compiler 106 may generate better code, since it may exploit run-time values from the original activation. For example, in this example, the optimizing compiler may exploit the values in the local variables. Further, it is noted that with this embodiment, the specialized continuation only applies to the current activation. To optimize other activations, the process must be repeated.

In the second embodiment, the run-time values are not exploited, but rather specialized code is instead generated for each yield point in the procedure. Recall that in the illustrative example, the procedure has two yields points, at program counters 20 and 30, respectively. According to the second embodiment, a specialized prologue is generated for the yield point at program counter 30 as follows: It is assumed that through analysis, it is determined that the stack has three locations at program counter 30, and two locals. Then the specialized prologue for program counter 30 would be:

```
x := LOAD FIRST STACK VALUE
PUSH x on the STACK
y := LOAD SECOND STACK VALUE
PUSH y on the STACK
z := LOAD THIRD STACK VALUE
PUSH z on the STACK
a := LOAD VALUE OF L1
L1 := a
b := LOAD VALUE OF L2
L2 := b
JUMP to INSTRUCTION 30
ORIGINAL INSTRUCTION 1
ORIGINAL INSTRUCTION 2
. . .
```

It is noted that in the prologue generated in accordance with the second embodiment, does not see the run-time values of the stack and local variables. Instead, the system must provide run-time services to load these values at run-time, when the specialized code executes. However, compared to the first embodiment, this prologue has the advantage that it is valid for any activation that is interrupted at program point 30. Furthermore, this specialized prologue may be generated before run-time, since it does not rely on any run-time values.

In the third embodiment, a prologue is generated that is valid for any yield point in the method. As in the prior example, assuming that each yield point in the method has at most three live stack locations, and two locals, the following specialized prologue is generated in accordance with the third embodiment:

```
x := LOAD FIRST STACK VALUE
PUSH x on the STACK
y := LOAD SECOND STACK VALUE
PUSH y on the STACK
z := LOAD THIRD STACK VALUE
PUSH z on the STACK
a := LOAD VALUE OF L1
L1 := a
b := LOAD VALUE OF L2
L2 := b
PC := LOAD CURRENT PROGRAM COUNTER
JUMP to INSTRUCTION PC
ORIGINAL INSTRUCTION 1
ORIGINAL INSTRUCTION 2
. . .
```

Note that in this example, a run-time service must be provided to extract the current run-time program counter. As with the second embodiment, this prologue is valid for any interrupted activation, and can be generated ahead of time since it does not rely on run-time values.

Figure 2:
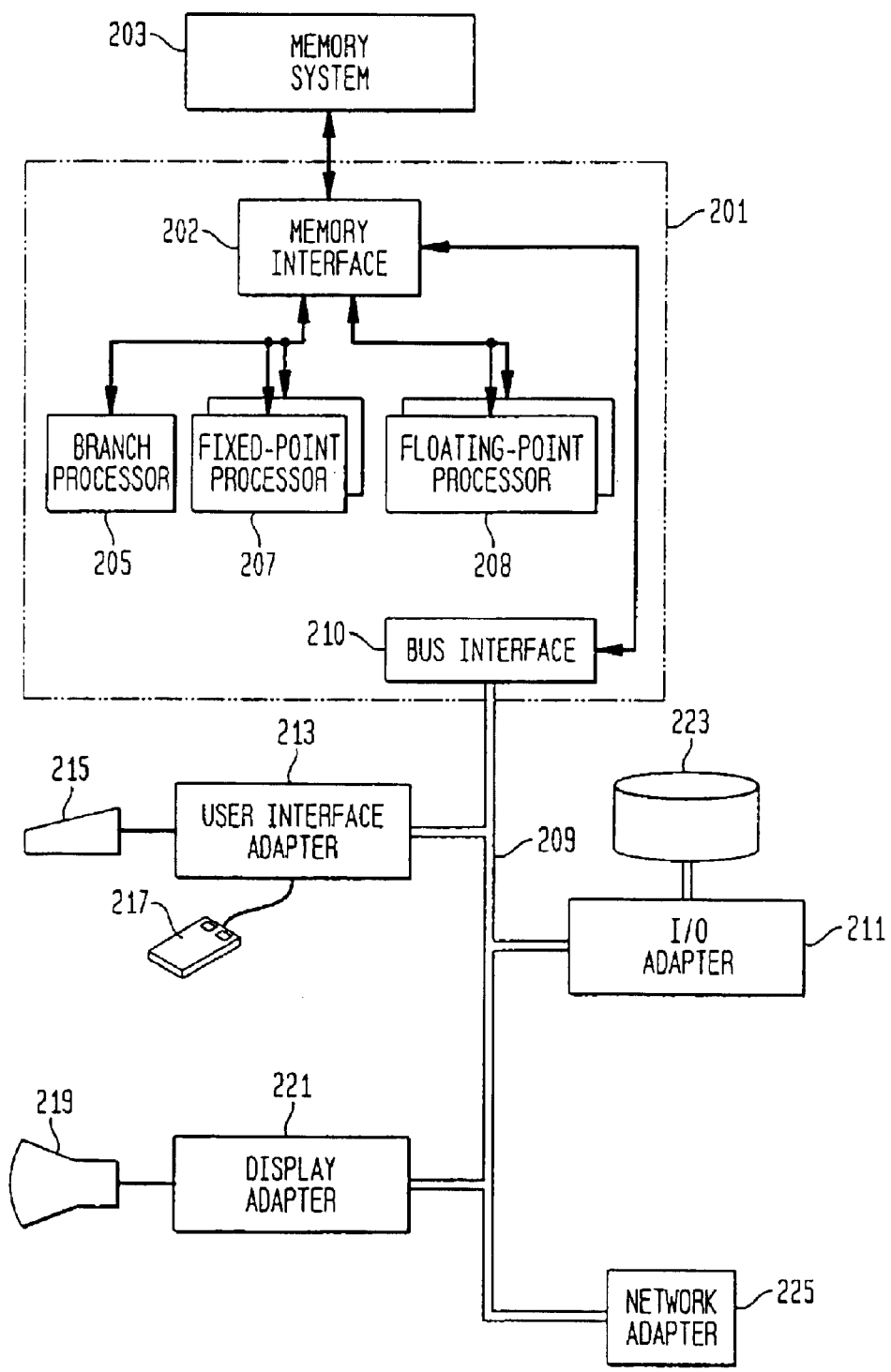
FIG. 2 is a detailed block diagram illustrating the computer hardware environment in which the method for dynamically optimizing executing activations according to the present invention is implemented.

Referring now to the drawings, and more particularly to FIG. 2, there is shown a representative computer processing apparatus 200 on which the subject invention may be implemented. The computer processing apparatus includes a central processing system 201 and memory system 203. The memory system 203 typically includes one or more cache memory subsystems and main memory, which is typically implemented using dynamic random-access memory modules. One or more of the cache memory subsystems may be partitioned into an instruction cache and data cache. The instruction cache stores instructions to be executed by the computer processing system 201. The data cache stores data to be used in the execution of such instructions. The computer processing system 201 includes one ore more execution units that interface to the memory system 203 by a memory interface 202. The execution units may include a branch processor 205, one or more integer units (FXU) 207, and one or more floating point units (FPU) 208 as shown. The branch processor 205 executes branch instructions fetched from the memory system 203. The FXU 203 executes integer based instructions fetched from the memory system 203. The FPU 208 executes floating point instructions fetched from the memory system 203. The computer processing apparatus may also include additional execution units (not shown), for example a multimedia execution unit, for executing varying sets of instructions issued from the instruction cache. The execution unit(s) of the computer processing system 201 access a register file in processing instructions. The register file typically includes a set of general purpose registers, a set of floating point registers, and a set of condition registers.

The computer processing system 201 includes a bus interface 210 that interfaces to one or more system buses 209 (one shown) to which are attached an input/output (I/O) adapter 211 and a user interface adapter 213. Typically, the user interface adapter 213 has attached to it a keyboard 215, a mouse 217 and/or other user interface devices such as a touch screen device (not shown). Such touch screen device would optionally be installed on the display 219, here represented as a cathode ray tube (CRT) display but which may be a liquid crystal display (LCD) or other suitable display device. The display 219 is connected to the system bus 209 via a display adapter 221.

The computer system's operating system (and other utilities), application program code and data are stored in persistent memory and temporarily loaded into the memory system 203 for execution by the computer processing system 201. The persistent memory is typically provided by a disk drive 223 that is coupled to the computer processing system 201 via system bus 209 and I/O adapter 211. In addition, persistent memory may be provided by network resources coupled to the computer processing system 201 via the system bus 209 and a network adapter 225. In this case, portions of the computer system's operating system (or other utilities), portions of the application program code and data may be retrieved from network resources and loaded into the memory system 203 for execution by the computer processing system 201.

Figure 3:
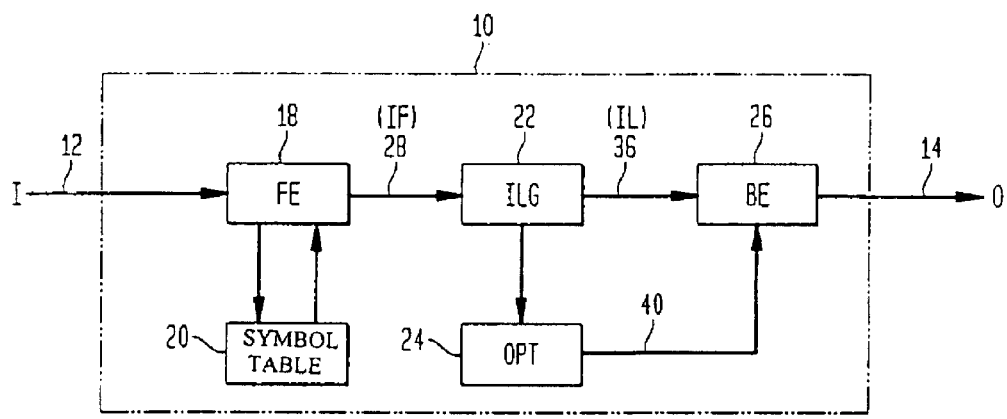
FIG. 3 is a detailed block diagram illustrating an optimizing compiler implemented in the present invention.

It should be noted that the mechanism of the present invention may be utilized in the generation and execution of a compiled program. A compiled program is generated by a compiler that compiles a source program thereby generating executable code for a specific computer architecture. As shown in FIG. 3, a compiler 10 accepts as an input (I) 12 a high-level language program, and operates on it to an end of generating an output (O) 14 comprising an output target language program 16. The output target language program is typically executable on a specific computer architecture. The compiler 10 typically includes a front end (FE) 18, a symbol table 20 for recording information about symbols in an input program, an intermediate language generator (ILG) 22, an optimizer (OPT) 24, and a back end (BE) 26. The front end 18 typically converts the input program 12 to a (possibly) different internal form (IF) that may be conveyed to the intermediate language generator 22. As part of the preparation of the internal form, the front end 18 typically parses and performs semantic analysis on the source code. The front end may save information in, and possibly retrieve information from, the symbol information data structure(s) 20. These symbol information data structures, if they are used, may either be separate from or adjoined to the intermediate form.

The intermediate language generator 22 produces intermediate language instructions (IL) from the internal form of the program, possibly consulting the symbol table 20. The intermediate language form of the program may be conveyed to the back end 26 either directly or by way of the optimizer 24. If the intermediate language (IL) form of the program is conveyed to the optimizer 24, then the optimizer produces a functionally equivalent and preferably faster or smaller version of the program, typically again in the intermediate form. This version of the program may then be conveyed to the back end 26. To this end, the optimizer 24 may be in communication with the symbol table 20. Once an intermediate language form of the program is received by the back end 26, either directly or after optimization, the back end 26 generates executable code for a specific computer architecture that is functionally equivalent to the intermediate language form of the program. In addition, for object oriented programming languages, the back end 26 implements an object model and generates code that implements the object oriented features used by the source program. In addition, the back end 26 may optimize the generated code. The constitutions and functions of these elements are well known in the art. For example, further description on the various intermediate language generators and other functionality of the compiler may be found in A. V. Aho et al., "Compilers Principles, Techniques and Tools", Addison-Wesley, 1986.

It should also be noted that the mechanism of the present invention may be utilized in the generation and execution of a compiled-interpreted program. A compiled-interpreted program is generated and executed by a hybrid compiler-interpreter. The compilation step is performed at compile time and the interpretation step is performed at execution time. In this case, the compiler compiles the source program thereby generating code in intermediate form (IL). At execution time, the interpreter may execute the intermediate code (IL) or translate the IL into a sequence of instructions for execution on a specific computer architecture. The interpreter may include a main interpretation routine and a number of operation specific routines. The main interpretation routine receives the intermediate code generated by the compiler as an input, interprets the code, and invokes the appropriate operation specific routine based upon the interpretation. Preferably, one of the operation specific routines of the interpreter handles method invocations. The constitutions of these elements and functions are known to skilled artisans.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for dynamically generating a new executable representation E of an input program representation P and causing a computer system to transfer execution to the new executable representation E from an original executable representation O, said method comprising:
   a) identifying one or more program yield points in the input program representation P at which execution of said original executable representation O can be interrupted to recover program state associated with said input program representation P;
   b) generating a prologue of statements which when used with the input program representation P, set up program state associated with the input program representation P at a particular yield point;
   c) adding said prologue of statements to an intermediate representation of said input program representation P to generate a new input program representation P';
   d) compiling the new input program representation P' with a compiler to generate the new executable representation E which is optimized for execution on a target computer system;
   e) the computer system transferring execution to the new executable representation E from the original executable representation O.

2. The method as claimed in claim 1, wherein said step b) of generating a prologue of instructions includes a step of directing control program flow to the defined yield point in the input program representation P after said setting up of program state.

3. The method as claimed in claim 1, wherein said original executable representation O of said input program representation P is generated by a compiler, said compiler identifying said yield points in the input program representation P in the process of generating the original executable representation O.

4. The method as claimed in claim 3, wherein said new executable representation E is optimized during run-time, said step d) of compiling the new input program representation P' including optimizing said new input representation P' based on run-time values of variables associated with said program state.

5. The method as claimed in claim 4, wherein said step b) of generating a prologue of instructions includes the steps of:
   halting execution during run-time of the original executable representation O at said yield point; and,
   extracting program state at said yield point, whereby said setting up of program state includes inserting a prologue of statements having statements for restoring said extracted program state.

6. The method as claimed in claim 3, wherein said new executable representation E is optimized before or during run-time, said step b) of generating a prologue of statements including the step of: generating a specialized code sequence for each potential yield point in said original executable representation O.

7. The method as claimed in claim 6, further including the step of: loading run-time values when said new executable representation E is executed.

8. The method as claimed in claim 7, wherein said input program representation P includes a sequence of Java byte codes, said run-time values include: a memory location value as held by a stack, and values of local variables.

9. The method as claimed in claim 3, wherein said new executable representation E is optimized before or during run-time, said step b) of generating a prologue of statements includes the step of: generating a specialized prologue being valid for any code sequence interrupted at any of said yield points.

10. The method as claimed in claim 9, further including the steps of: loading run-time values when said new executable representation E is executed, said run-time values including: a memory location value as held by a stack, values of local variables and, a current run-time program counter value.

11. The method as claimed in claim 1, wherein said original executable representation O is a directly interpretable representation intended for execution by an interpreter.

12. A system for dynamically generating a new executable representation E of an input program representation P and causing a computer system to transfer execution to the new executable representation E from an original executable representation O, said system comprising:
   a first compiler for inserting one or more program yield points in the input program representation P at which execution of said original executable representation O can be interrupted to recover program state associated with said input program representation P;
   a mechanism for generating a prologue of statements which when used with the input program representation P, set up program state associated with the input program representation P, said generating mechanism adding said prologue of statements to an intermediate representation of said input program representation P to generate a new input program representation P';
   a second compiler device for compiling the new input program representation P' to generate the new executable representation E which is optimized for execution on a target computer system;
   the target computer system transferring execution to the new executable representation E from the original executable representation O.

13. The system as claimed in claim 12, wherein said first compiler device includes a non-optimizing compiler.

14. The system as claimed in claim 12, wherein said second compiler device includes an optimizing compiler.

15. The system as claimed in claim 14, wherein said new input program representation P' is optimized during run-time, said second compiler device loading run-time values of variables associated with said program state when said new input program representation P' is executed.

16. The system as claimed in claim 15, wherein said prologue generating mechanism comprises:
   mechanism for halting execution during run-time of the unoptimized original sequence at said yield point; and,
   mechanism for extracting program state at said yield point, whereby said setting up of program state includes inserting a prologue of statements having statements for restoring said extracted program state.

17. The system as claimed in claim 15, wherein said original program code sequence includes a sequence of Java byte codes, said run-time values including: a memory location value as held by a stack, and values of local variables.

18. The system as claimed in claim 14, wherein said new input program representation P' includes a prologue of instructions associated with each potential yield point in said unoptimized original code sequence, said new input program representation P' is capable of being optimized before or during run-time.

19. The system as claimed in claim 14, wherein said new input program representation P' includes prologue of instructions valid for any code sequence interrupted at any of said yield points, said new input program representation P' is capable of being optimized before or during run-time.

20. A computer program product comprising a computer readable medium having recorded thereon a computer program which, when loaded in a computer, configures a computer for dynamically generating a new executable representation E of an input program representation P and causing a computer system to transfer execution to the new executable representation E from an original executable representation O, said method comprising:
   a) identifying one or more program yield points in the input program representation P at which execution of said original executable representation O can be interrupted to recover program state associated with said input program representation P;
   b) generating a prologue of statements which when used with the input program representation P, set up program state associated with the input program representation P at a particular yield point;
   c) adding said prologue of statements to an intermediate representation of said input program representation P to generate a new input program representation P'; and
   d) compiling the new input program representation P' with a compiler to generate the new executable representation E which is optimized for execution on a target computer system;
   e) the target computer system transferring execution to the new executable representation E from the original executable representation O.

* * * * *